(12) United States Patent
Wagner

(10) Patent No.: US 8,590,170 B2
(45) Date of Patent: Nov. 26, 2013

(54) RAZOR BLADE TAPE MEASURE MULTI-TOOL

(76) Inventor: Peter Paul George Wagner, West Vancouver (CA)

( * ) Notice: Subject to any disclaimer, the term of this patent is extended or adjusted under 35 U.S.C. 154(b) by 343 days.

(21) Appl. No.: 13/053,764

(22) Filed: Mar. 22, 2011

(65) Prior Publication Data

US 2012/0240419 A1    Sep. 27, 2012

(51) Int. Cl.
*G01B 3/10* (2006.01)

(52) U.S. Cl.
USPC ................................. 33/760; 33/768

(58) Field of Classification Search
USPC ............... 33/755, 759, 760, 761, 768
See application file for complete search history.

(56) References Cited

U.S. PATENT DOCUMENTS

| | | | | |
|---|---|---|---|---|
| 4,700,489 A * | 10/1987 | Vasile | | 33/760 |
| 6,526,673 B1 * | 3/2003 | Reed | | 33/761 |
| 6,941,672 B2 * | 9/2005 | Scarborough | | 33/761 |
| 7,228,644 B1 * | 6/2007 | Hellem et al. | | 33/760 |
| 7,676,950 B2 * | 3/2010 | Ogilvie | | 33/760 |
| 8,020,312 B1 * | 9/2011 | McGahan | | 33/768 |
| 2007/0214674 A1 * | 9/2007 | Erisoty et al. | | 33/761 |
| 2008/0141549 A1 * | 6/2008 | Brown | | 33/755 |
| 2012/0073152 A1 * | 3/2012 | McGahan | | 33/760 |

* cited by examiner

*Primary Examiner* — G. Bradley Bennett

(57) ABSTRACT

A multi-tool assembly with retractable tape measure, with pivotably mounted, straight edge blade arm, fully sheathed razor blade knife, carpenter's square, protractor and a set of 3 screwdrivers integrated into the housing assembly. The straight edge blade arm and integral razor blade knife, protractor and carpenters square, are fully imbedded into the tape measure housing assembly. The straight edge arm can be manually opened or spring powered to open automatically when a release button is activated, allowing the straight edge blade arm to snap open and lock in place like a switchblade. The set of screwdrivers permanently mounted on the back of the housing assembly are held in the open and closed positions by means of friction and/or a clip mechanism between the screwdriver bit and the housing assembly. The blade arm and screwdrivers pivot open individually, allowing each tool to protrude, and be used independently.

6 Claims, 6 Drawing Sheets

RAZOR BLADE TAPE MEASURE MULTI-TOOL

| References Cited: U.S. patent Documents | | | |
|---|---|---|---|
| 551,052 | December 1895 | Shonnard et al | 30/159 |
| 720,507 | February 1903 | Van Horn | 33/761 |
| 1,313,432 | August 1919 | Walker | 33/465 |
| 1,553,985 | April 1925 | Ciesnierski | 30/162 |
| 2,305,065 | December 1942 | Corkish | 33/42 |
| 2,416,277 | November 1945 | Siegel | 30/158 |
| 2,808,646 | October 1957 | Lohr | 30/159 |
| 3,744,134 | July 1973 | Zima | 33/768 |
| 4,348,815 | September 1982 | Hurt | 33/419 |
| 4,744,150 | May 1988 | Horvath | 33/760 |
| 4,890,393 | January 1990 | St. Jean | 33/668 |
| 4,922,621 | May 1990 | Maier | 33/465 |
| 5,077,910 | January 1992 | Smith | 33/760 |
| 5,357,683 | October 1992 | Trevino | 33/465 |
| 5,430,952 | July 1995 | Betts | 33/760 |
| 5,481,810 | January 1996 | Hastings | 33/484 |
| 5,787,599 | August 1998 | Clifton | 33/760 |
| 6,279,186B1 | July 2001 | Ge et al | 7/163 |
| 6,338,204 | January 2002 | Howie | 33/758 |
| 7,228,644B1 | June 2007 | Hellem et al | 33/760 |

FOREIGN PATENT DOCUMENTS

None.

TECHNICAL FIELD

This invention relates to retractable rule assemblies, razor blade knives, protractors, right angle carpenter's squares, levels, screwdrivers and multi-tools having a plurality of uses and attachments. The current preferred embodiment of the invention includes a retractable rule assembly coupled with a pivotably mounted straight edge arm which, when opened, forms a carpenter's square with the housing assembly and the extended rule assembly, with integral straight edge arm locking mechanism, sheathed razor blade knife, wire stripper, protractor and a set of screwdrivers pivotably mounted on the back of the housing assembly. With all components of the tool locked in the fully closed position, the current embodiment of the Razor Knife Tape Measure Multi-tool is essentially the same size as a standard tape measure of similar length. The high tensile steel razor blade knife creates an extremely sharp cutting edge, much sharper than a traditional fold out pocket knife.

BACKGROUND

Retractable tape measures, utility knives and screw drivers are three of the world's most commonly used hand tools. Although there are many variations in the design of these individual tools, the prior art is well established for these devices. Prior art also includes examples of many tools joined together into an army-knife like multi-tool, but often the selection of the combined tools do not complement each other or the form in which they are integrated is not practical or visually appealing, The selection of combined tools and how they fit and work together is fundamental to the design of the invention.

Normally, each of these devices come as separate, individual tools, requiring the users to purchase, store and locate more than one tool to do a variety of tasks. An object of the invention is to provide a standard, high quality, retractable tape measure and extend its usefulness and versatility by integrating additional devices into one, compact, handheld tool.

Many people would find it beneficial to have these complimentary tools permanently connected into one handy, lightweight multi-tool, rather than use several, loose, individual tools. A multi-tool the same basic size and shape as a standard tape measure, but which also incorporated a sheathed razor blade knife, a right angle carpenter's square, a protractor and a set of screwdrivers would greatly extend the usefulness and versatility of an ordinary tape measure. Because the razor blade is made from ultra-thin, high tensile steel, the cutting edge of the razor knife is extremely sharp, sharper than a traditional pocket knife.

The Razor Knife Tape Measure Multi-tool maintains the primary function and quality of a modern, full size retractable tape measure and adds the versatility of several additional tools into a single, convenient, easily transported, handheld multi-tool. In the preferred embodiment, the invention provides a single tool, the same basic size and shape as a standard retractable, tape measure, to replace nine individual tools; a retractable tape measure, a right angle carpenter's square, a protractor, a utility knife, a wire stripper, a level and a set of three screwdrivers.

BRIEF DESCRIPTION OF DRAWINGS

Embodiments of the Razor Knife, Tape Measure Multi-tool will now be further described by way of example, with reference to the accompanying drawings, wherein.

DETAILED DESCRIPTION OF DRAWINGS

Figure 1:
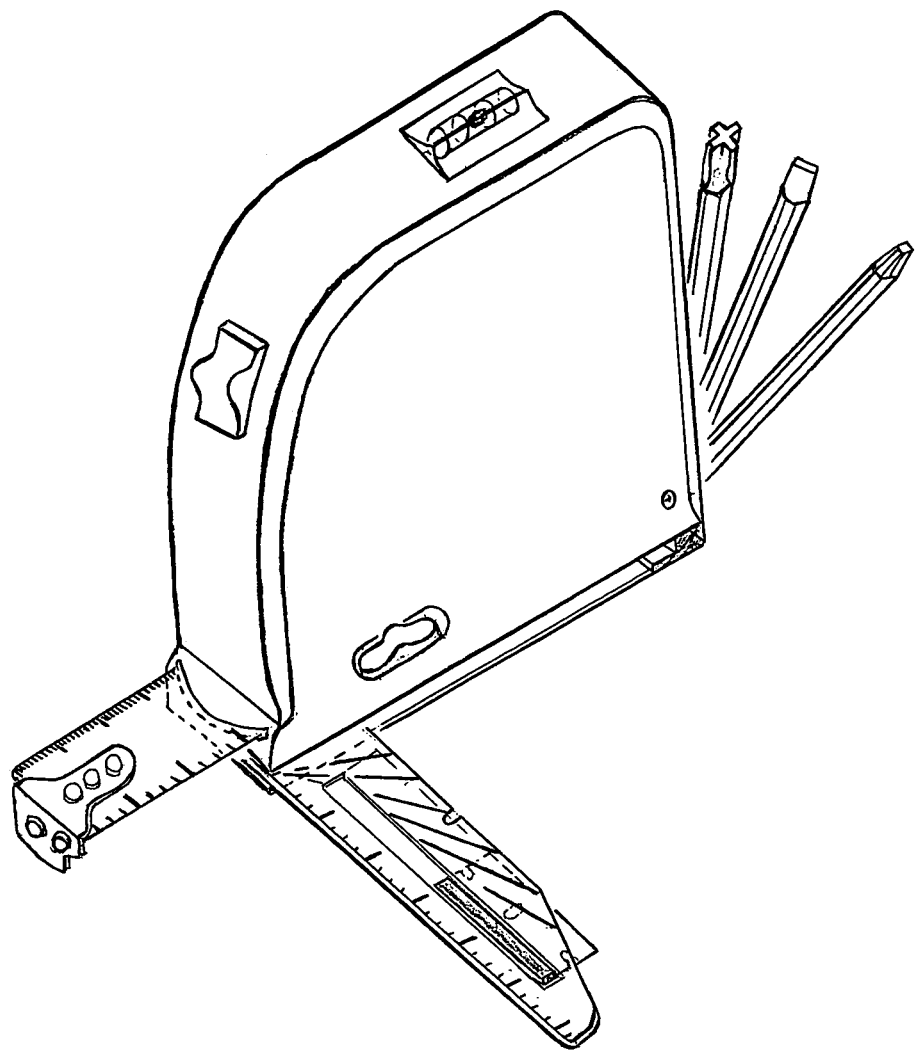
FIG. 1 is an isometric view of the preferred embodiment of the invention with the ruled tape assembly partly extended, the straight edge blade arm extended and locked in the right angle position with the set of three screwdrivers partly extended.
Figure 2:
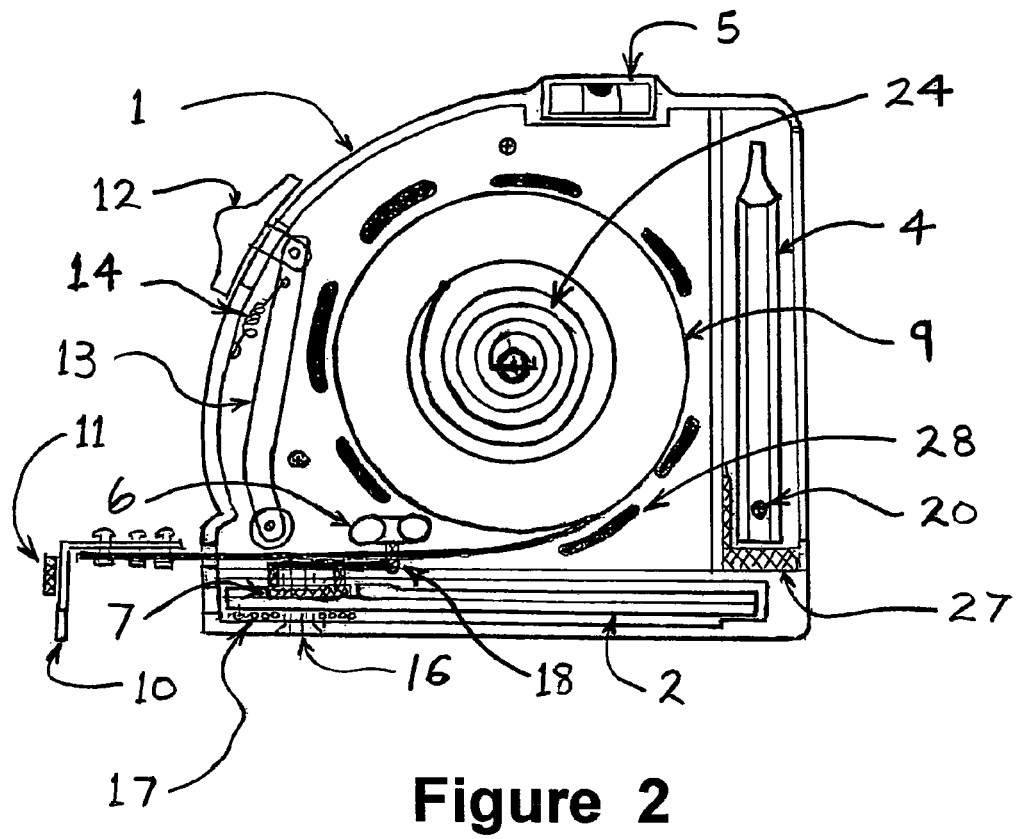
FIG. 2 is a Side View Cross Section of the embodiment of FIG. 1 with the ruled tape assembly partly extended and the straight edge blade arm and screwdrivers in the fully closed positions.
Figure 3:
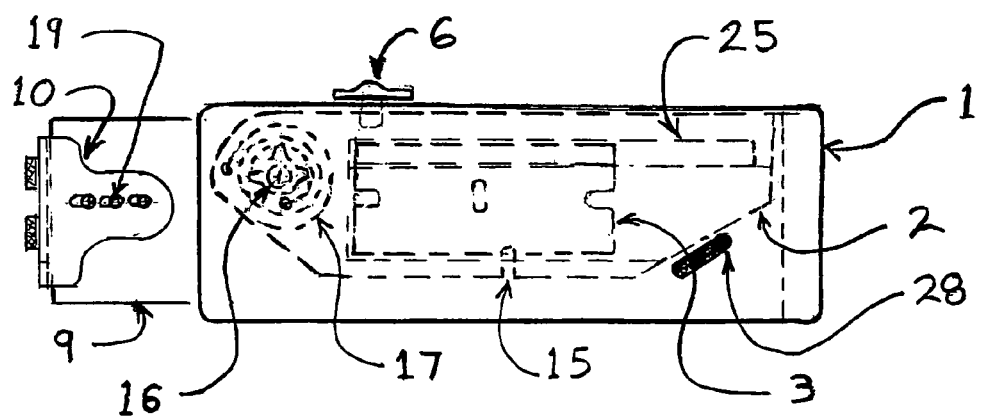
FIG. 3 is a Bottom View of the bottom of the housing assembly of the embodiment of FIG. 1 with the ruled tape assembly partly extended and the straight edge blade arm and screwdrivers in the fully closed positions.
Figure 4:
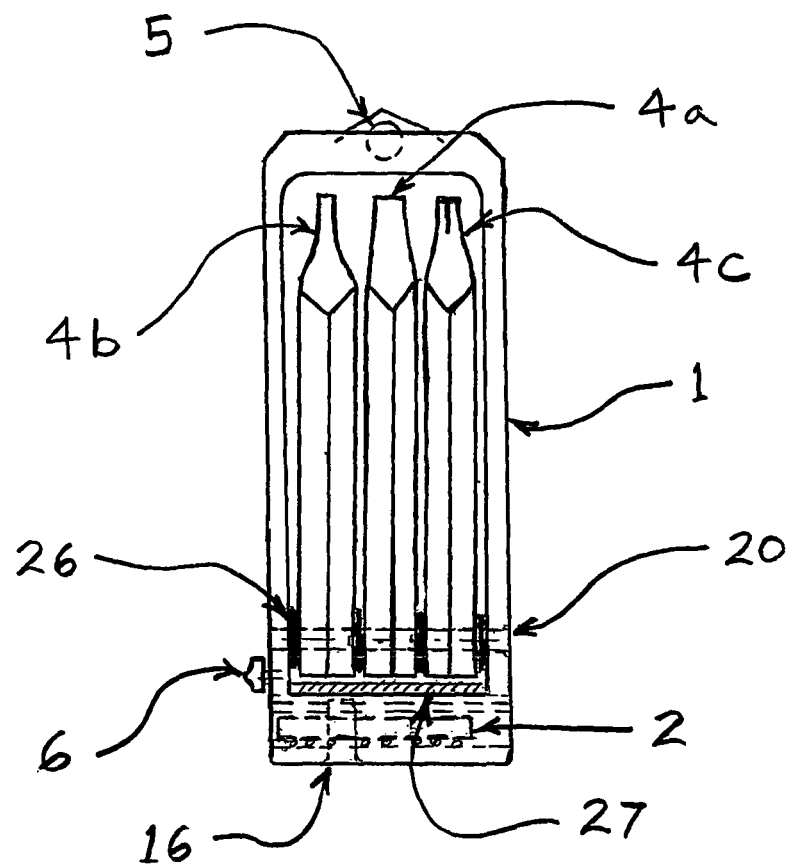
FIG. 4 is a Back View of the embodiment of FIG. 1 with the straight edge arm and screwdrivers in the fully closed positions.
Figure 5:
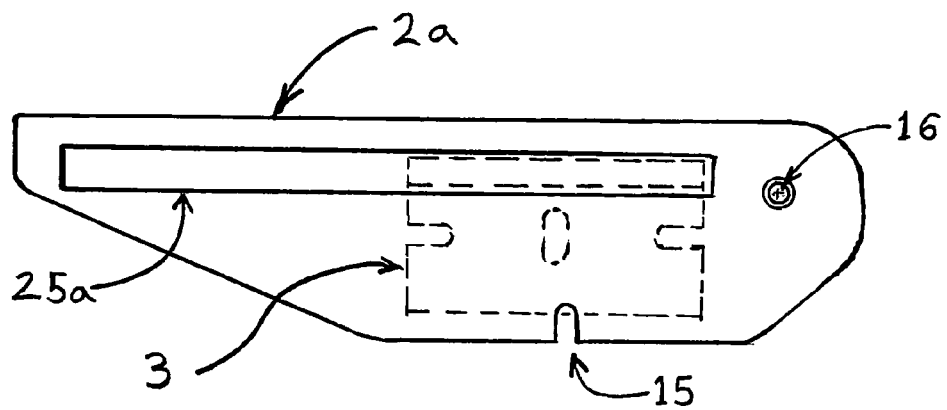
FIG. 5 is a Plan View Detail of the bottom side of the straight edge blade arm of the embodiment of FIG. 1.
Figure 6:
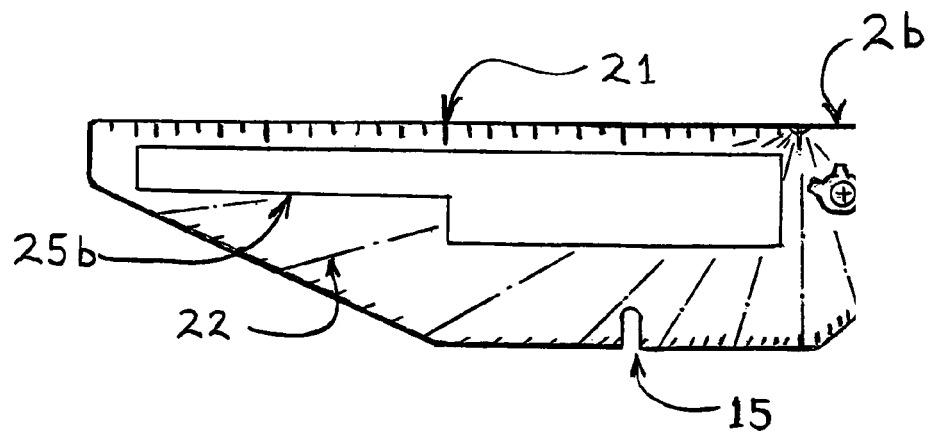
FIG. 6 is a Plan View Detail of the upper or top side of the straight edge blade arm of the embodiment of FIG. 1.
Figure 7:
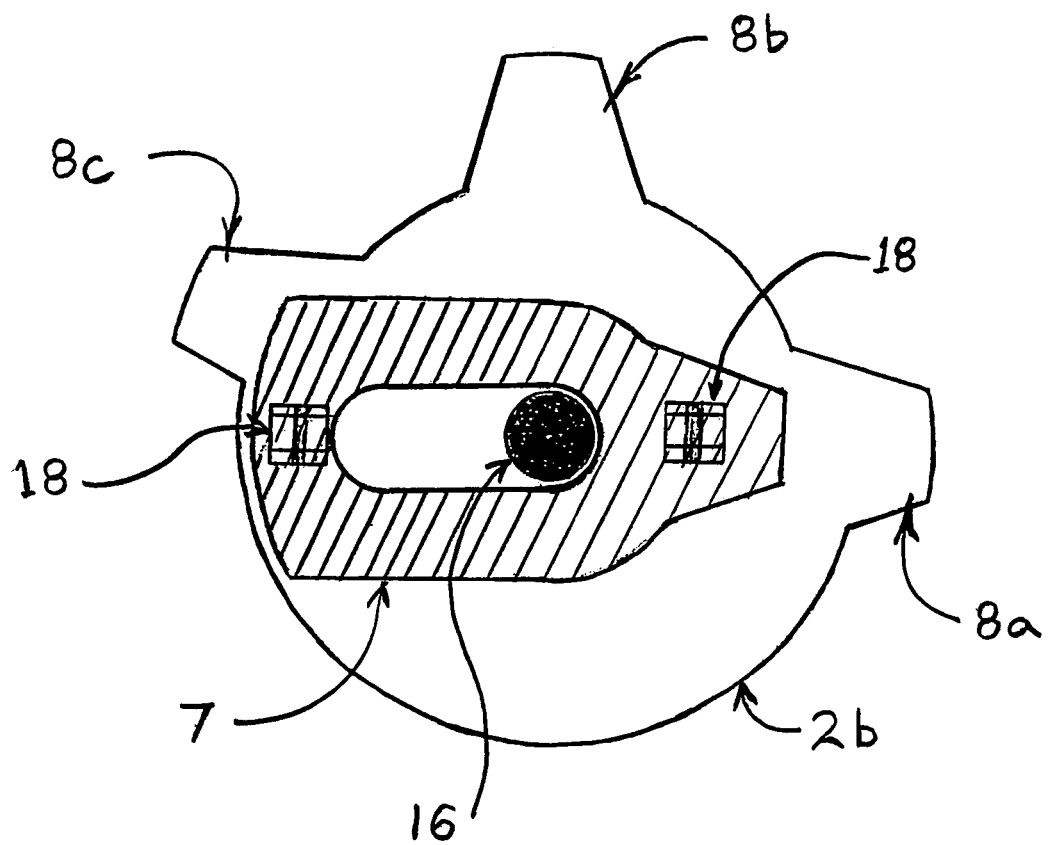
FIG. 7 is a Plan View Detail of the straight edge blade arm locking mechanism of the embodiment of FIG. 1 showing the upper and lower parts of the straight edge blade arm.
Figure 8:
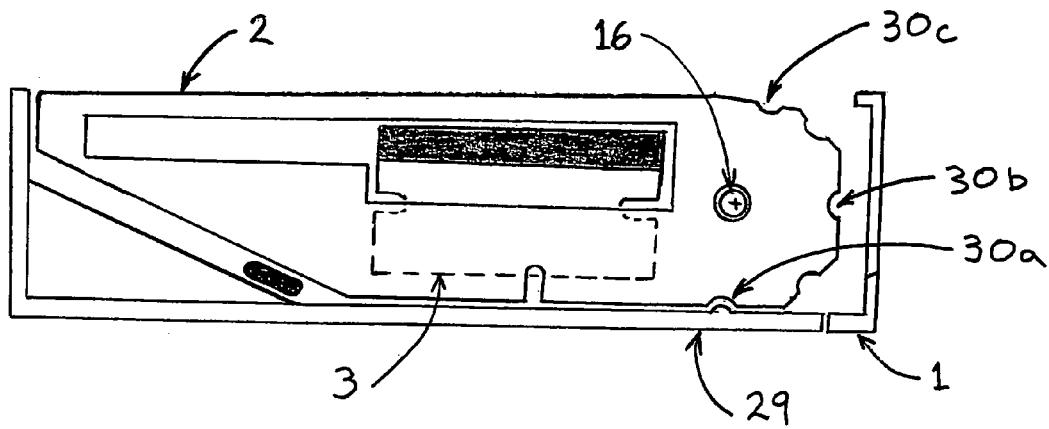
FIG. 8 is a Bottom View Cross Section of the manual opening locking mechanism of the straight edge blade arm of the embodiment of FIG. 1, with the blade arm locked in the fully closed position.
Figure 9:
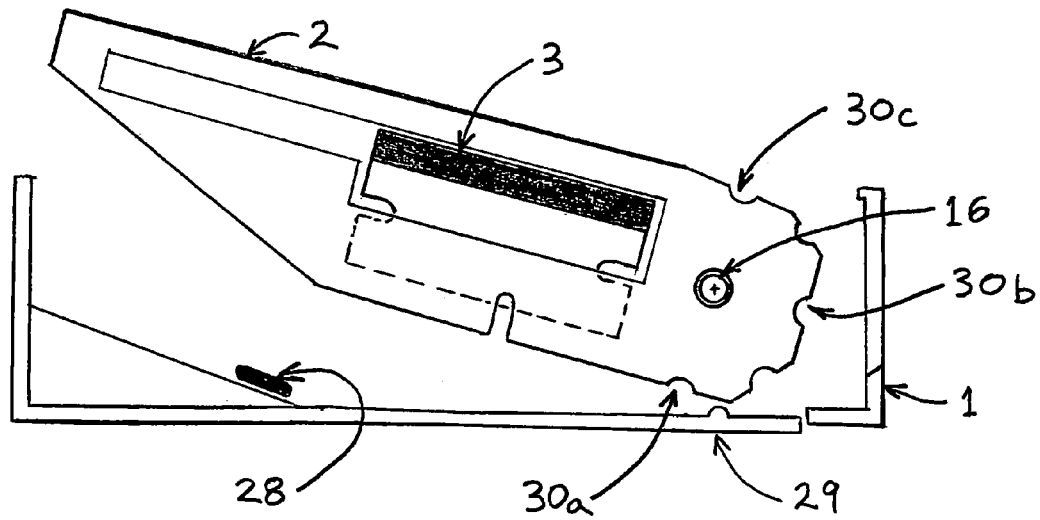
FIG. 9 is a Bottom View Cross Section of the manual opening locking mechanism of the straight edge blade arm of the embodiment of FIG. 1, with the blade arm in a partially open position.

Referring to the drawings; FIGS. 1 through 9, a ruled tape measure, razor blade knife, carpenter's square, protractor, wire stripper and multi-head screwdriver set Combination Assembly according to the invention comprises a housing assembly (1) having a front wall, a back wall, a top wall, a bottom wall, one left wall and one right wall, attached together in a specific spaced configuration which creates a distinct compartment for each of the tool assemblies; a ruled tape spool (9) and spool retraction assembly (24) with rule tape end lead extending through a slot in the front face of the housing assembly where the rule tape end tip (10) prevents the full retraction of the tape measure and incremental length markings allow measurements to be made, including a ruled tape breaking mechanism which, when not de-activated by the ruled tape brake actuator button (12), creates friction between the breaking mechanism and the ruled tape, thereby holding the ruled tape in a fixed position, a retractable, straight edge blade arm (2) with integral length (21) and angle measurement markings (22), sheathed razor blade knife (3) slidably mounted between the upper (2b) and lower (2a) parts of the straight edge blade arm (2) which when manually opened, or released by the blade arm actuator button (6), pivots out and locks into one of the pre-set locking notches; one locking notch locks the blade arm perpendicular to the ruled tape to form a carpenter's square with the housing assembly, another locks the blade arm in the fully open position which allows the blade arm and razor to protrude out from the housing assembly like a knife blade and another locks the blade arm in the fully closed position, a set of retractable screwdrivers pivotably mounted on a screwdriver set pivot post (20) such that each of the screwdrivers (4a, 4b and 4c) can be swiveled out and used individually by pivoting them 90 degrees about the pivot post (20) and are held in the closed and open position by friction resistance acting on the base of each screw driver contacting the housing assembly component in the fully open and fully retracted positions and an air bubble in sealed liquid vial (5) mounted in the same spatial plane as the bottom of the housing assembly and perpendicular to the spatial plane of the back of the housing assembly so as to allow measurement of level in both the vertical and horizontal planes.

The operation of the retractable, ruled tape spool (9) is driven by the ruled tape retraction assembly that forces the ruled tape to automatically retract into the housing assembly whenever the ruled tape braking mechanism is not engaged.

The torque needed to retract the ruled tape scroll is provided by means of a ruled tape recoil spring (24) which has one end fastened to a static anchor point near the centre of the ruled tape scroll and the other end fastened to the ruled tape. The housing assembly contains scroll guides (23) which form a circular shape to contain the ruled tape scroll and tape retraction assembly. A ruled tape end tip (10) with tip magnets (11) permanently fastened to the tip, is slidably fastened to the end of the ruled tape with two or more fasteners (19) in a such a manner that the tip end is loose to move parallel to the axis of the extended ruled tape, an amount equal to the thickness of the end tip and end tip magnets, thereby allowing for accurate measurement when compressed in against a surface and when pulled out against the outer edge of a surface. Measurement markings are provided on the top surface of the ruled tape to allow measurement of distance.

The ruled tape breaking mechanism is controlled by exerting a force on the ruled tape brake actuator button to disengage the braking mechanism. Prior Art contains many examples of suitable spool breaking mechanisms. The braking mechanism exerts a force on the ruled tape, causing friction to inhibit movement of the ruled tape, thereby locking it in place. The tape brake actuator spring is biased to automatically engage the braking mechanism.

The manually opening Razor Knife Tape Measure Multi-tool uses a cantilever style blade arm lock spring (29) with a protruding dimple to exert force against the flat surfaces and notches in the end of the straight edge blade arm thereby locking the arm into one of several predetermined positions. The first notch (30a) locks the blade arm in the fully closed position, another (30b) locks the blade arm at a 90 degree angle relative to the side wall of the housing assembly and another (30c) locks the blade arm into the fully open position.

The automatic, spring opening Razor Knife Tape Measure Multi-tool opens when a force is exerted on the blade arm release actuator button (6) slidably mounted on the side of the housing assembly exerting a force through the brake assembly linkage (18) to disengage the blade arm blocking pin (7) thereby releasing the straight edge blade arm which pivots open in a spatial plane parallel to the plane of the bottom of the assembly housing. The straight edge blade arm pivots about an axle centerline and post (16) which is perpendicular to the plane of the bottom of the housing assembly. The blade arm actuator button transfers force through the blocking pin linkage assembly (18) which is connected to the blocking pin (7) at one end, and to the blade arm actuator button (6) at the other. When a force is exerted on the release button, the brake assembly linkage transfers the force to the straight edge arm blocking pin mechanism, thereby exerting a force against the actuator return spring, pulling the blocking pin out of the closed position holding notch and freeing the blade arm to pivot open under the power of the blade arm spring (17).

Predetermined stop notches formed into the upper half of the straight edge blade arm allow the blade arm to be locked in one of the three predetermined positions; the fully closed position, the right angle position and the fully open position. Additional notches may be added for any selected angles within the full range.

When no force is exerted on the actuator button, the actuator return spring forces the blocking pin towards the front of the housing into one the holding notches (8) in the blade arm locking it into position. When the straight edge blade arm is pushed into the fully closed position, fully retracted into the main body of the housing assembly, the closed position notch is automatically engaged to hold the blade arm in the closed position. Stop notches have a specific tip shape to ensure accurate alignment of the blocking mechanism.

On opening, the first position notch is set to lock the blade arm into the closed position (8a), the second position notch (8b) locks the blade arm into a 90 degree or right angle position relative to the side wall of the housing assembly and to the extended ruled tape assembly. Another locking position notch (8c) is provided to lock the blade arm into a fully open position, approximately 170 degrees open, relative to the blade arm's closed position (0 degrees), so that the razor blade knife can be manually slid laterally into the open (unsheathed) position and used to cut or score material.

The straight edge blade arm has both length and angle measurement increment markings (21 & 22 respectively) to allow the blade arm to be used as both a straight edge ruler and a protractor. Angle increments on the straight edge arm are read with respect to the side of the housing assembly. The blade arm has both an upper (2b) and lower side (2a), such that a thin space is created between the upper and lower sides for the razor blade to fit into. A slot (25) is formed through both sides of the blade arm such that a standard razor blade can fit into the slot to hold in place while still allowing it to slide laterally, parallel to the long length of the blade arm. When moved to one end of the slot, closest to the blade arm pivot point (16), the razor blade is fully sheathed within the upper and lower parts of the straight edge blade arm.

When a force is manually exerted on the razor blade, it slides from one end of the razor blade slot to the other allowing the user to choose the amount the blade protrudes out. In the open position, a large portion of the sharp edge of the razor blade protrudes from the blade arm allowing the razor blade to be used as a cutting tool.

One side of the razor blade itself is permanently sheathed with a thin, folded over, sheet metal cover, completely covering one of the two sharpened cutting edges of the standard razor blade. The sheet metal razor cover is sized to fit within the slot so that it is firmly held in position, but can still slide easily back and forth along the length of the razor blade slot. The razor blade, a standard, shaving type, razor blade made of an extremely hard and thin metal material, such as high tensile stainless steel, creates an extremely sharp cutting blade.

The larger slot in the upper part of the straight edge arm (25b) allows the razor blade to be removed from the slot and replaced by manually exerting a force perpendicular to the razor blade, thereby bending the razor slightly upwards and removing the razor from the slot. This allows a new razor blade to be inserted into the tool to replace the original razor if it breaks of becomes dull. The back edge of the razor blade cover may be contoured to provide a rough or interlocking surface to facilitate holding it in position. A matching, rough or interlocking surface may also be created on the inner edge of the slot such that the razor blade cover engages with the rough or interlocking surface to inhibit lateral movement of the razor blade when in use.

An indentation notch (15) is added to the straight edge arm, which, at its maximum depth exposes a small part of the sheathed razor blade allowing it to cut through electrical wire insulation, thereby acting as a wire stripper. By varying the amount of blade exposure, number and size of indentations, the wire stripping feature of the device can accommodate different wire sizes. The razor blade stop (28) physically interferes with the razor blade when attempting to close the blade arm without the razor blade being fully sheathed. This safety feature prevents the blade arm from being automatically opened with the blade exposed.

The preferred embodiment includes a set of three screw drivers pivotably mounted at the back side of the housing assembly. An opening in the housing assembly allows the retractable screw drivers to pivot about an axle (20) such that each screwdriver can be extracted to protrude out from the housing assembly and are held in the fully closed of fully open positions by means of friction resistance between the base of each screw driver and a flexible material within the housing assembly, in the fully open and fully retracted position. By exerting a force on the screwdrivers and creating a torque about the pivot axle, the friction is overcome and each screwdriver pivots 90 degrees, from the fully closed position, to the fully open position. The centerline of the screw driver pivot point is perpendicular to the sides of the housing assembly. Washers spaced between the screwdriver bits (26) accommodate movement between screwdriver bits and can be used to enhance the screwdriver locking ability. A flexible, elastic material (27) is built into the housing assembly on two sides of the screwdriver pivot axle comes into contact with the bottom ends of the screwdrivers to create friction to hold the screwdrivers in place in the fully closed position and fully open positions. When fully open, the screwdrivers extend out from the back of the housing assembly so that they can be used as a screwdriver by holding the housing assembly in one hand.

Another alternate assembly includes a bubble level vial (5) mounted on the top of the housing assembly with the long axis of the vial parallel to the spatial plane of the bottom of the housing assembly. The long axis of the vial may also be perpendicular to the spatial plane of the back side of the housing assembly allowing the single bubble vial to measure both the horizontal level and vertical level by using the bottom and back sides of the housing assembly respectively.

Other alternate assemblies may integrate other common tool bits, details or components such as a second knife blade, and extendable blade arm, file blade, hammering surface, saw blade, small crescent wrench, small pliers, bottle opener, LED battery powered lights, lasers pointers or marker lines, scissors, nail clipper, mp3 player, etc.

Another alternate assembly includes laser marker lines with battery and switch assemblies to create laser marker lines parallel to the ruled tape and to the straight edge arm, thereby creating a large, virtual carpenter's square.

What is claimed is:

1. A, retractable tape measure, carpenter's square, protractor combination assembly comprising:
    a housing assembly having two opposing side walls, a front wall, a back wall, a top wall and a bottom wall, spatially arranged to form distinct compartments,
    an extendable and retractable ruled tape assembly coiled into a spool, complete with refraction spring and spool brake assemblies, all contained within the housing assembly, with one end of the ruled tape protruding out of a slot in the front of said housing assembly, with a tape end tip fastened to the end of the ruled tape to prevent the tape from being fully refracted,
    an, openable and retractable straight edge blade arm with markings for both length and angle measurement relative to the side wall of the housing assembly, pivotably mounted within a compartment formed into the bottom of the housing assembly, allowing the straight edge blade arm to pivot open and protrude out from the housing assembly at varying angles when the blade arm is manually opened,
    a spring powered locking mechanism which forces the end of a cantilever locking spring against flat surfaces and/or notches in the blade arm, to lock the blade into one of several predetermined positions; one keeps the blade arm locked in the fully closed or fully retracted position, another locks the straight edge blade arm at 90 degrees relative to the side of the housing assembly to form a small carpenter's square and another locks the blade arm in the fully open position.

2. A, retractable tape measure, razor blade knife, carpenter's square, protractor combination assembly comprising:
    a housing assembly having two opposing side walls, a front wall, a back wall, a top wall and a bottom wall, spatially arranged to form distinct compartments,
    an extendable and retractable ruled tape assembly coiled into a spool, complete with retraction spring and spool brake assemblies, all contained within the housing assembly, with one end of the ruled tape protruding out of a slot in the front of said housing assembly; with a tape end tip fastened to the end of the ruled tape to prevent the tape from being fully retracted,
    an, openable and retractable straight edge blade arm with integral, sliding razor blade and markings for both length and angle measurement relative to the side wall of the housing assembly, pivotably mounted within a compartment formed into the bottom of the housing assembly, allowing the straight edge blade arm to pivot open and protrude out from the housing assembly at varying angles when the blade arm is manually opened, a spring powered locking mechanism which forces the end of a cantilever locking spring against flat surfaces and or notches in the blade arm, to lock the blade into one of several predetermined positions; one keeps the blade arm locked in the fully closed or fully retracted position, another locks the straight edge blade arm at 90 degrees relative to the side of the housing assembly to form a small carpenter's square, and another locks the blade arm in the fully open position, allowing the straight edge blade arm to be used as a cutting tool.

3. A, retractable tape measure, spring out carpenter's square and protractor combination assembly comprising:

a housing assembly having two opposing side walls, a front wall, a back wall, a top wall and a bottom wall, spatially arranged to form distinct compartments, an extendable and retractable ruled tape assembly coiled into a spool, complete with retraction spring and spool brake assemblies, all contained within the housing assembly, with one end of the ruled tape protruding out of a slot in the front of said housing assembly, with a tape end tip fastened to the end of the ruled tape to prevent the tape from being fully retracted, a spring powered, openable and retractable straight edge blade arm, pivotably mounted within a compartment formed into the bottom of the housing assembly, allowing the straight edge blade arm, to automatically pivot open and protrude out from the housing assembly at various angles when the blade arm actuator button is activated, a spring powered blocking pin assembly, released by exerting a force on an actuator button which exerts a force on the linkage and blocking pin assembly, biased to force the blocking pin into the blade arm locking notches to lock the blade into predetermined positions, one to keep the blade arm locked in the closed or fully retracted position, another to lock the straight edge blade arm at 90 degrees relative to the extended tape measure and side of the housing assembly and another to lock the blade arm in the fully open position.

4. A retractable tape measure, spring out carpenter's square with integral razor blade knife and protractor combination assembly comprising:

a housing assembly having two opposing side walls, a front wall, a back wall, a top wall and a bottom wall, spatially arranged to form distinct compartments, an extendable and retractable ruled tape assembly coiled into a spool, complete with retraction spring and spool brake assemblies, all contained within the housing assembly, with one end of the ruled tape protruding out of a slot in the front of said housing assembly, with a tape end tip fastened to the end of the ruled tape to prevent the tape from being fully retracted, a spring powered, openable and retractable straight edge blade arm, with integral sliding razor blade, pivotably mounted within a compartment formed into the bottom of the housing assembly, allowing the straight edge blade arm, to automatically pivot open and protrude out from the housing assembly at varying angles when the blade arm actuator button is activated, a spring powered blocking pin assembly, released by exerting a force on an actuator button which exerts a force on the linkage and blocking pin assembly, biased to force the blocking pin into the blade arm locking notches to lock the blade into predetermined positions, one to keep the blade arm locked in the closed or fully retracted position, another to lock the straight edge blade arm at 90 degrees relative to the extended tape measure and side of the housing assembly and another to lock the blade arm in the fully open position, a razor blade slidably mounted within the straight edge arm so that the razor can be manually slid to fully sheath or partially expose the razor's cutting edge.

5. A retractable tape measure and screwdriver set combination assembly comprising:

a housing assembly having two opposing sides, a front, a back, a top and a bottom, spatially arranged to form distinct compartments, an extendable and retractable ruled tape assembly coiled into a spool, complete with retraction spring and spool brake assemblies, all contained within the housing assembly, with one end of the ruled tape protruding out of a slot in the front of said housing assembly, with a tape end tip fastened to the end of the ruled tape to prevent it from being fully retracted, one or more screw drivers and/or file or saw blades pivotably fastened to the housing assembly to allow each device to individually pivot open and protrude out from housing assembly to be used to drive a screw, pry things, file or saw.

6. A combination assembly according to claims 1, 2, 3 or 4, further comprising one or more screw drivers and/or file/saw blades pivotably fastened to the housing assembly to allow each device to individually pivot open and protrude out from the back of the housing assembly to be used to drive a screw, pry things, file or saw.

* * * * *